(12) United States Patent
Nicolaas et al.

(10) Patent No.: US 10,401,188 B2
(45) Date of Patent: Sep. 3, 2019

(54) METHOD AND APPARATUS FOR PROVIDING POINT OF INTEREST INFORMATION

(71) Applicant: TomTom Traffic B.V., Amsterdam (NL)

(72) Inventors: Dionysius Nicolaas, Amsterdam (NL); Vladislav Dmitrev, Almere (NL); David Silsbury, Amsterdam (NL); Rory Jones, Amsterdam (NL)

(73) Assignee: TOMTOM TRAFFIC B.V., Amsterdam (NL)

( * ) Notice: Subject to any disclaimer, the term of this patent is extended or adjusted under 35 U.S.C. 154(b) by 137 days.

(21) Appl. No.: 15/531,446

(22) PCT Filed: Dec. 2, 2015

(86) PCT No.: PCT/EP2015/078425
§ 371 (c)(1),
(2) Date: May 29, 2017

(87) PCT Pub. No.: WO2016/087550
PCT Pub. Date: Jun. 9, 2016

(65) Prior Publication Data
US 2018/0306600 A1    Oct. 25, 2018

(30) Foreign Application Priority Data
Dec. 2, 2014 (GB) .................................. 1421441.5

(51) Int. Cl.
*G01C 21/36* (2006.01)
*G01C 21/34* (2006.01)
(Continued)

(52) U.S. Cl.
CPC ......... *G01C 21/3682* (2013.01); *G01C 21/32* (2013.01); *G01C 21/3492* (2013.01);
(Continued)

(58) Field of Classification Search
CPC .......................... G01C 21/3682; G01C 21/32; G01C 21/3492; G01C 21/3679; G01C 21/3691;
(Continued)

(56) References Cited

U.S. PATENT DOCUMENTS 6,950,797 B1    9/2005  Hirayama
8,649,967 B1    2/2014  Daniel
(Continued)

FOREIGN PATENT DOCUMENTS

EP       2075777 A2     7/2009
WO    2007007377 A1     1/2007
(Continued)

OTHER PUBLICATIONS

International Search Report dated Nov. 21,2016 for application No. PCT/EP2015/078425.
(Continued)

*Primary Examiner* — Marthe Y Marc-Coleman

(57) ABSTRACT

Embodiments of the present invention provide a method of providing data associated with a point of interest (POI), comprising determining, based on a location of a POI, a portion of digital map data of a geographic region, said digital map data comprising a plurality of segments representing navigable elements of a navigable network within the geographic region, and generating POI-map data associated with the POI indicative of at least some segments within the portion of digital map data.

18 Claims, 10 Drawing Sheets

(51) Int. Cl.
*G06F 17/30* (2006.01)
*H04W 4/021* (2018.01)
*G06F 16/29* (2019.01)
*G01C 21/32* (2006.01)
*G08G 1/0967* (2006.01)

(52) U.S. Cl.
CPC ..... *G01C 21/3679* (2013.01); *G01C 21/3691* (2013.01); *G01C 21/3697* (2013.01); *G06F 16/29* (2019.01); *G08G 1/096716* (2013.01); *H04W 4/021* (2013.01)

(58) Field of Classification Search
CPC .......... G01C 21/3697; G06F 17/30241; G08G 1/096716; H04W 4/021
USPC ......................................................... 701/533
See application file for complete search history.

(56) References Cited

U.S. PATENT DOCUMENTS

| | | | |
|---|---|---|---|
| 8,818,716 B1 | 8/2014 | El Dokor et al. | |
| 9,464,908 B2 | 10/2016 | Oel et al. | |
| 2009/0030607 A1 | 1/2009 | Sakata et al. | |
| 2009/0105947 A1 | 4/2009 | Nachesa et al. | |
| 2012/0310527 A1 | 12/2012 | Yariv et al. | |
| 2013/0006515 A1 | 1/2013 | Vellaikal et al. | |
| 2014/0248911 A1 | 9/2014 | Rouda, Jr. | |
| 2014/0303889 A1 | 10/2014 | Richter | |
| 2015/0241225 A1* | 8/2015 | Liu | G01C 21/3682 701/540 |
| 2016/0069697 A1* | 3/2016 | Oel | G01C 21/3476 701/426 |
| 2016/0069699 A1* | 3/2016 | Chen | G01C 21/3605 701/426 |
| 2016/0169701 A1 | 6/2016 | Yang et al. | |
| 2016/0313130 A1 | 10/2016 | Baselau et al. | |

FOREIGN PATENT DOCUMENTS

| | | |
|---|---|---|
| WO | 2013060925 A1 | 5/2013 |
| WO | 2013132031 A1 | 9/2013 |

OTHER PUBLICATIONS

Search Report dated May 28, 2015 for GB Application No. 1421441.5.

Search Report dated May 28, 2015 for GB Application No. 1421442.3.

International Search Report dated Feb. 3, 2016 for application No. PCT/EP2015/078428.

* cited by examiner

METHOD AND APPARATUS FOR PROVIDING POINT OF INTEREST INFORMATION

CROSS-REFERENCE TO RELATED APPLICATIONS

The present application is a National Stage of International Application No. PCT/EP2015/078425, filed on Dec. 2, 2015, and designating the United States, which claims benefit to United Kingdom Patent Application 1421441.5 filed on Dec. 2, 2014, the entire content of which is incorporated herein by reference.

FIELD OF THE INVENTION

The invention relates, in embodiments, to method and apparatus for providing data associated with a point of interest (POI). The invention further relates, in embodiments, to methods and apparatus for providing information associated with a point of interest, such as based on data associated with the POI.

BACKGROUND TO THE INVENTION

Mobile electronic devices, such as smart phones, portable navigation devices and integrated navigation systems, that include GNSS (Global Navigation Satellite Systems) signal reception and processing functionality are well known and are widely employed as in-car or other vehicle navigation systems. In general terms, a known electronic device having navigation functionality comprises a processor, memory (at least one of volatile and non-volatile, and commonly both), and digital map data stored within said memory. The processor and memory cooperate to provide an execution environment in which a software operating system may be established, and additionally it is commonplace for one or more additional software programs to be provided to enable the functionality of the mobile device/PND to be controlled, and to provide various other functions.

Such devices also include a GNSS antenna, such as a GPS antenna, by means of which satellite-broadcast signals, including location data, can be received and subsequently processed to determine a current location of the device relevant to the digital map. The device may also include electronic gyroscopes and accelerometers which produce signals that can be processed to determine the current angular and linear acceleration. The determined acceleration may then be used in conjunction with location information derived from the GPS signal to determine the velocity and relative displacement of the device and thus vehicle in which it is typically mounted. Such sensors are most commonly provided in in-vehicle navigation systems, but may also be provided in the mobile device/PND itself.

In recent years, such devices have also been used in systems to alert drivers when they are approaching known locations of points of interest (POIs), which could be: speed enforcement devices (i.e. speed traps and enforcement cameras); road hazards, such as school zones, accident black spots, road works; and weather hazards such as black ice, snow, flooding and heavy rain, brush fires etc. Speed cameras are provided to slow traffic often at locations known to represent accident black spots, and may themselves represent hazards as other road users may brake suddenly and unexpectedly, which is a common response by some drivers when they see a speed enforcement device. Devices that warn a driver of the presence of a speed enforcement device improve the driver's safety since they warn the driver of the location of such hazards.

In such systems, a device having a GPS antenna and access to a database containing the location of points of interest (POIs) is typically provided in a vehicle. The device is configured to warn a driver when the vehicle, using the location information derived from the GPS signal, is approaching the location of a POI stored in the database.

In some systems, such as when the device is a navigation device and comprises a digital map representative of a navigable network, e.g. the road network, information about POIs, including their location, is typically contained in the digital map. The digital map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. The location of POIs is typically provided with reference to the segments of the digital map, although the digital map will often also contain the geographic coordinates of the POI, e.g. longitude and latitude. Accordingly, when the current location of a device is matched to the digital map, then a warning or other information about a POI can be provided when the current location of the device is moving along a segment to which the POI is associated. This allows warnings or other information to be provided only if required, however it often requires significant storage space on the device for the digital map data.

It is also known in other system to provide alerts and other information about POIs without the use of a digital map. In such systems, the locations of the POIs are stored as geographic coordinates, e.g. longitude and latitude, in a data repository often stored locally on a mobile device, but which may be periodically updated by, for example, the mobile device receiving an update by wireless communication from a central server. In these systems, a search region, commonly in the form of a cone, is defined in front of the device, and warnings and other information is provided to a user in relation to any POIs that fall within this search region. While this significantly reduces the storage space required on the device, it can lead to a number of unnecessary warnings and alerts being provided to the user. This is exemplified in FIGS. 1A, 1B and 10. FIG. 1A illustrates an example of a false negative, i.e. no or late warning, due to a curvy road. In this example, the device is coming from the top left, and the cone, i.e. search region, will miss the POI (in this case a speed camera) due to the bend in the road. FIGS. 1B and 10 illustrate examples of a false positive, i.e. a warning for POIs that are irrelevant or will not be passed; commonly found when roads are parallel.

It is an object of embodiments of the invention to at least mitigate one or more of the problems of the prior art.

SUMMARY OF THE INVENTION

In accordance with a first aspect of the invention there is provided a method of providing data associated with a point of interest (POI), comprising:

determining, based on a location of a POI, a portion of digital map data of a geographic region, said digital map data comprising a plurality of segments representing navigable elements of a navigable network within the geographic region; and generating POI-map data associated with the POI indicative of at least some segments within the portion of digital map data.

In an embodiment, the determination of the portion of digital map data can comprise determining an extent of the POI-map based on a radius from the location of the POI. Alternatively, the determination of the portion of digital map data can comprise determining the portion of digital map data comprises determining an extent of the POI-map based on one or more routes leading to the POI. In this embodiment, the method can comprise determining a plurality of routes leading to the POI and an extent of each route.

The term "segment" as used herein takes its usual meaning in the art. A segment may be a navigable element (or link) that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments. The nodes of the navigable network as represented by the digital (or electronic) map data include nodes representative of nodes connecting segments of the navigable network in the real world, e.g. junctions, intersections, etc. The nodes represented by the electronic map data may also include artificial nodes, which are not representative of nodes in the real world. For example, an artificial node may be added when a speed limit changes along a navigable element. Similarly, and as discussed in more detail below, an artificial node may be added along a navigable element at the location of a point of interest (POI).

In embodiments, the POI can be a speed enforcement device (SED) and the portion of the digital map data can be determined on the basis of a warning time or warning distance to the SED.

The method can comprise selecting the POI from a database storing a plurality of POIs.

The method can comprise generating the POI-map data comprises inserting a node into the digital map data at the location of the POI. In an embodiment, the method comprises storing one or more attributes indicative of features of the POI associated with the node. In embodiments, the POI is an SED and the one or more attributes indicate one or both of a type of SED and a direction of the SED.

The generation of the POI-map data can comprise storing an attribute associated with data indicative of at least one road segment wherein the attribute is indicative of the road segment having a lower probability of leading to the POI. The probability of leading to the POI can be determined based on an angle between the road segment and a road segment associated with the POI. Additionally, or alternatively, the generation of the POI-map data can comprise determining one or more road segments from which the POI cannot be reached. Additionally, or alternatively, the generation of the POI-map data can comprise storing an attribute associated with data indicative of the one or more road segments from which the POI cannot be reached.

The method can comprise storing the POI-map data in a database. The POI-map data can be stored in association with a cell indicative of a geographic area.

Viewed from another aspect, the present invention provides a computing device, such as a server, arranged to provide data associated with a point of interest (POI), comprising:

means for determining, based on a location of a POI, a portion of digital map data of a geographic region, said digital map data comprising a plurality of segments representing navigable elements of a navigable network within the geographic region; and means for generating POI-map data associated with the POI indicative of at least some segments within the portion of digital map data.

The present invention is a computer implemented invention. The means for carrying out any of the steps of the method may comprise a set of one or more processors configured, e.g. programmed, for doing so. A given step may be carried out using the same or a different set of processors to any other step. Any given step may be carried out using a combination of sets of processors.

The computing device, e.g. server, can comprise means for storing the generated POI-map data in a data store.

The computing device, e.g. server, can be operably connected to a communication means arranged to cause at least some of the generated POI-map data to one or more mobile devices.

According to another aspect of the invention there is provided a method of providing information associated with a point of interest (POI), comprising:

communicating location information indicative of a determined geographic location of a portable device to a server computer;

receiving at least one POI-map from the server computer based on the location information, wherein each POI-map is associated with at least one POI and comprises segments representative of navigable elements of a navigable network;

determining a segment of a received POI-map corresponding to the determined geographic location of the portable device; and outputting a notification associated with a POI of the received POI map based on the navigable segment.

The POI-map can comprise an attribute associated with at least some of the segments, the attribute being indicative of a likelihood of the segment leading to the POI. A type of the notification can be based on the attribute. The attribute can have a value indicative of the associated segment not leading to the POI; a notification associated with the POI can be prevented from being output when the location information corresponds to the segment.

The segments of each POI-map may be indicative of segments at least within one of a predetermined distance or predetermined travelling time of the POI. In embodiments, the POI is a speed enforcement device and the predetermined distance is a predetermined warning distance and the predetermined travelling time is a predetermined warning time.

The segment corresponding to the determined geographic location can be determined based on a bounding region around the segment and the geographic location.

In embodiments, a determination as to whether to utilise a POI-map is based on one of a distance between the geographic location and the POI, and the geographic location and an extent of the POI-map. The POI-map may be utilised when the distance is less than a first distance.

Additionally, or alternatively, the use of the POI-map can be ceased when the distance is greater than a second distance.

The received at least one POI-map can, in embodiments, be stored in a memory associated with the device. POI-maps can be deleted from the memory based on a geographic location of the device. For example, a POI-map can be deleted when the geographic location is more than a predetermined distance from the POI associated with the POI-map.

Viewed from another aspect, the present invention provides a portable device, such as a navigation device, arranged to provide information associated with a point of interest (POI), comprising:

means for communicating location information indicative of a determined geographic location of the portable device to a server computer;

means for receiving at least one POI-map from the server computer based on the location information, wherein each POI-map is associated with at least one POI and comprises segments representative of navigable elements of a navigable network;

means for determining a segment of a received POI-map corresponding to the determined geographic location of the portable device; and means for outputting a notification associated with a POI of the received POI map based on the navigable segment.

The present invention is a computer implemented invention. The means for carrying out any of the steps of the method may comprise a set of one or more processors configured, e.g. programmed, for doing so. A given step may be carried out using the same or a different set of processors to any other step. Any given step may be carried out using a combination of sets of processors.

For example, in an embodiment, the portable (or mobile) device comprises: a location module for determining a geographic location of the device; a communication module for wirelessly communicating with a server computer; and a processor arranged to perform the steps of the method.

Any of the methods in accordance with the present invention may be implemented at least partially using software, e.g. computer programs. The present invention thus also extends to a computer program comprising computer readable instructions executable to perform a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE FIGURES

Embodiments of the invention will now be described, by way of example only, with reference to the accompanying figures, in which.

DETAILED DESCRIPTION OF THE FIGURES

Embodiments of the present invention include methods and apparatus for providing map information associated with a point of interest (POI). The map information is data indicative of navigable paths in a vicinity of a respective POI. Further embodiments of the present invention include methods and apparatus for providing information, such as a notification or warning, associated with a POI using received map information associated with the point of interest (POI). Exemplary embodiments of the invention will be explained with reference to speed enforcement devices, such as so called speed cameras, as POIs, although it will be realised that embodiments of the invention are not limited in this respect.

A speed enforcement device (SED) is arranged proximal to a portion of a road in order to enforce a speed limit associated with the road. The SED may be arranged at a location to monitor a speed of vehicles passing that location, i.e. at a discrete geographic location, or may be arranged to monitor a speed of a vehicle over a section of road, for example over a 1 km (or other length) section of road. When a vehicle exceeds a predetermined speed, which may be higher than the speed limit, then appropriate action may be taken such as communicating information associated with the vehicle, for example registration details or an image of the vehicle, to a computer system for enforcement action to be taken. It is known for a navigation device to provide a warning when a location of the navigation device approaches the location of the SED.

Figure 1A:
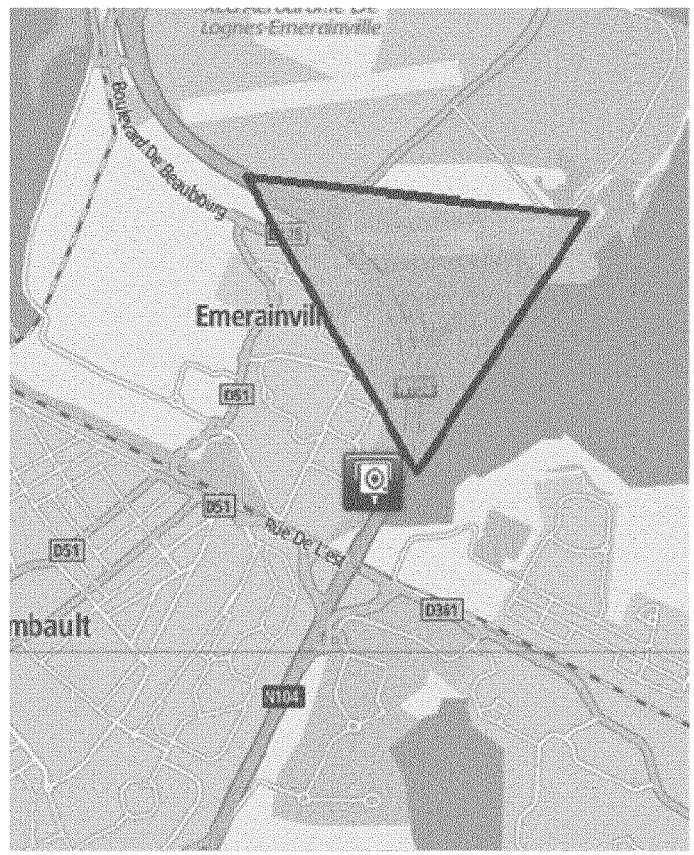
FIGS. 1A, 1B and 1C illustrate an exemplary conventional method for determining the presence of POIs for which warnings or information are to be provided.
Figure 1B:
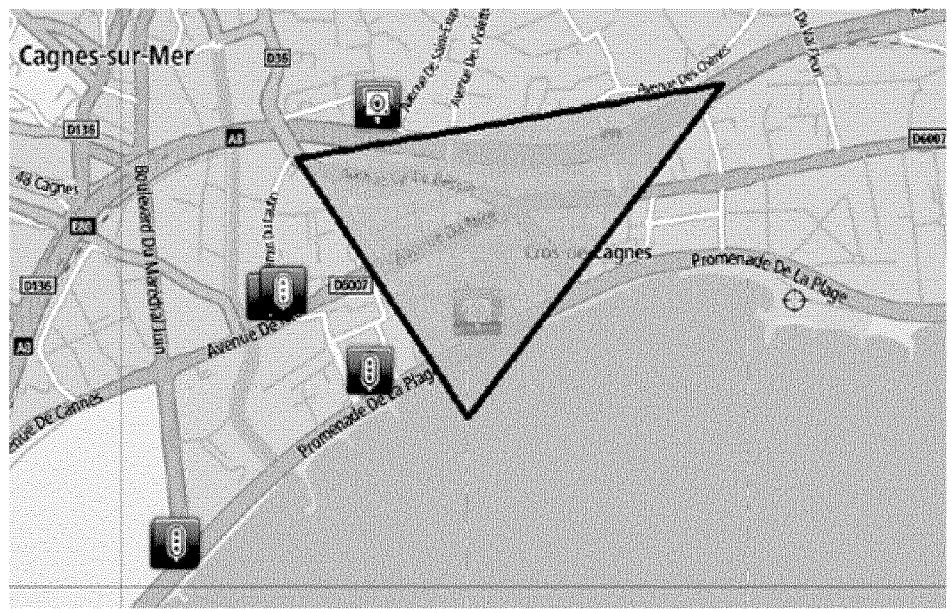
Figure 1C:
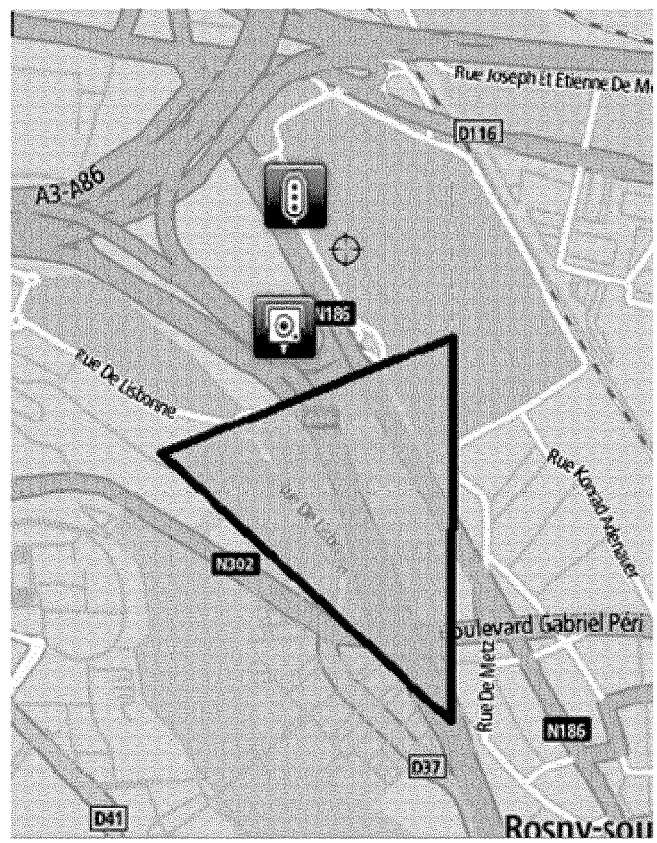

As discussed above, one prior approach to providing such a warning by a navigation device which does not comprise map data indicative of a road network is to store, accessible to the navigation device, SED data indicative of geographic locations of SEDs. The navigation device determines whether a location of the navigation device is within a predetermined distance of the location of an SED and whether a cone or angular projection from one, or both, of a heading of the navigation device and the SED intersect. Once the cones or projections intersect, the navigation device is arranged to output a warning indicating the presence of the SED. This approach is prone to providing false warnings, for example where the SED enforces a speed limit opposite to the direction of travel of the navigation device or the SED is arranged on a road adjacent to that on which the navigation device is travelling, but within the cone or angular projection of the navigation device such that the warning is output (e.g. as shown in FIGS. 1A, 1B and 1C).

Figure 2:
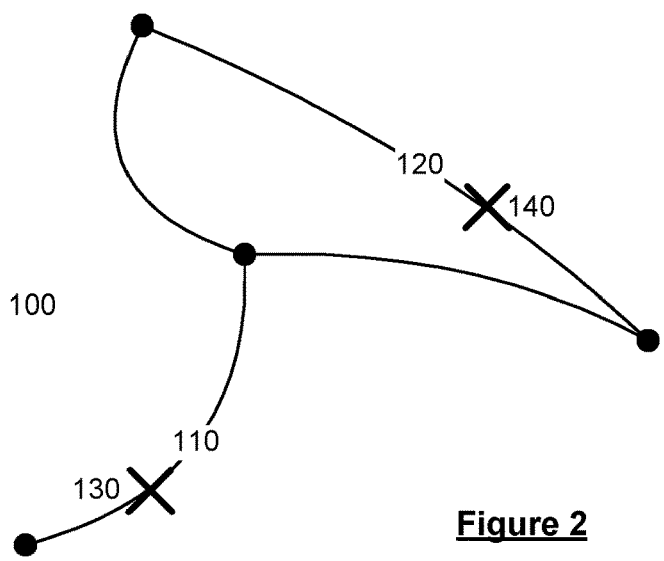
FIG. 2 illustrates an exemplary portion of map data including POIs.

Another prior approach to providing a warning involves the navigation device storing map data and SED data, which may be combined with the map data, indicative of the geographic locations of SEDs which are associated with the map data, such as being associated with a road segment of the map data. FIG. 2 illustrates a portion of map data 100 comprising a plurality of road segments interconnecting a plurality of nodes (not all of which are given reference numerals for clarity). In particular the map data comprises a first road segment 110 and a second road segment 120 which are associated with a first SED 130 and a second SED 140, respectively, the locations of which are indicated with X. The locations of the SEDs 130, 140 may be defined with respect to portions of the map data, for example the location of the first SED 130 may be defined as 50 m along road segment 110 from node 111. It will be realised that the locations of the SEDs may be defined in other ways. The navigation device is arranged to match a geographic location of the navigation device to the map data to determine a road segment of the map data along which the navigation device is travelling. For example, the navigation device may determine that its current location corresponds to a position along road segment 110 based on received signals. When the navigation device approaches the position on the road segment at which the SED 130 is located the navigation device is arranged to provide a warning. Whilst this approach may provide more accurate warnings a large amount of storage is required to store map data and SED data. For example, map and SED data for a country may be 200 MB. Thus this approach is less suitable for navigation devices having fewer resources, for example those implemented on generic computing devices such as smartphones.

Figure 3:
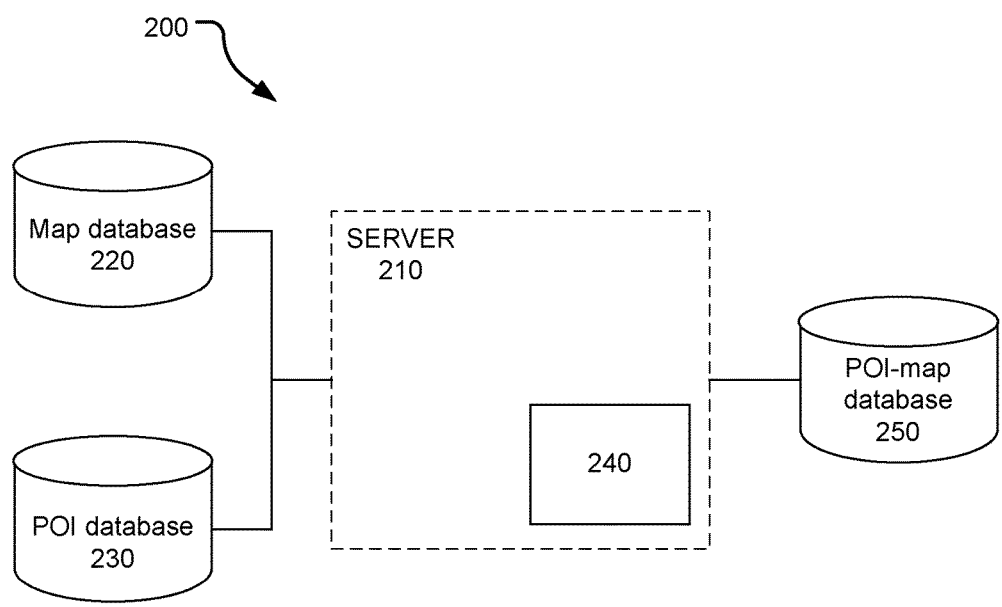
FIG. 3 illustrates an exemplary system for generating POI-maps.

FIG. 3 illustrates a system 200 according to an embodiment of the invention. The system 200 comprises a server computer 210, a map database 220, a POI database 230 (which in an embodiment is a database of SEDs, although it will be appreciated that it can be a database of any one or more types of POI as desired) and a POI-map database 250.

The server computer 210 may be implemented as one or more computing units which are arranged to operatively execute a POI-map module (POIM) on at least one processor thereof. The server computer 210 is communicably coupled to the map database 220 and the SED database 230. The server computer 210 may store the map database 220 and the SED database 230 or these may be provided by another computer system to which the server computer 210 is communicably coupled. The map database 220 and the SED database 230 may be provided as separate data structures or may be integrated into a single data structure or database.

The map database 220 is arranged to store digital map data representing navigable real-world paths in a network. The map data may be formed from information indicative of segments interconnecting nodes, wherein the segments represent a navigable network. Alternatively the map data may be formed by nodes having associated attributes wherein at least some attributes are indicative of connections between nodes having common attributes representing a connection therebetween. The connections are indicative of navigable segments in the real world. The navigable segments may be road segments, but may also be segments of any navigable network such as a cycle or path network. It will be realised that the map data may be structured in a different manner.

The SED database 230 is arranged to store SED data indicative of locations of speed enforcement devices. The locations of the SEDs may be defined with respect to the map data, for example the location of an SED 130 may be defined as a distance along a road segment from a specified node. The locations of the SEDs may alternatively be defined with reference to a location-referencing system, e.g. a coordinate system such as longitude and latitude. It will be realised that the locations of the SEDs may be defined in other ways. Furthermore, it will also be realised that the SED data may be combined with the map data. Whilst the present invention is described with reference to SEDs it will be realised that the SEDs may be data indicative of other types of POI.

The map database 220 and SED database 230 store map and SED data, respectively, for a geographic area such as one or more countries or states.

The POIM 240 is arranged to generate POI-maps based on the map database 220 and SED database 230. Each POI-map comprises map data for a geographic area which is smaller than the geographic area for which the map database 220 stores data. In some embodiments the POI-map is indicative of selected roads within a vicinity of the associated POI, as will be explained. In the case where the POI is a SED the POI-map is generated for a geographic area based on a warning time or distance. The POI-maps are stored in the POI-map database 250 once generated by the POIM 240.

Figure 4:
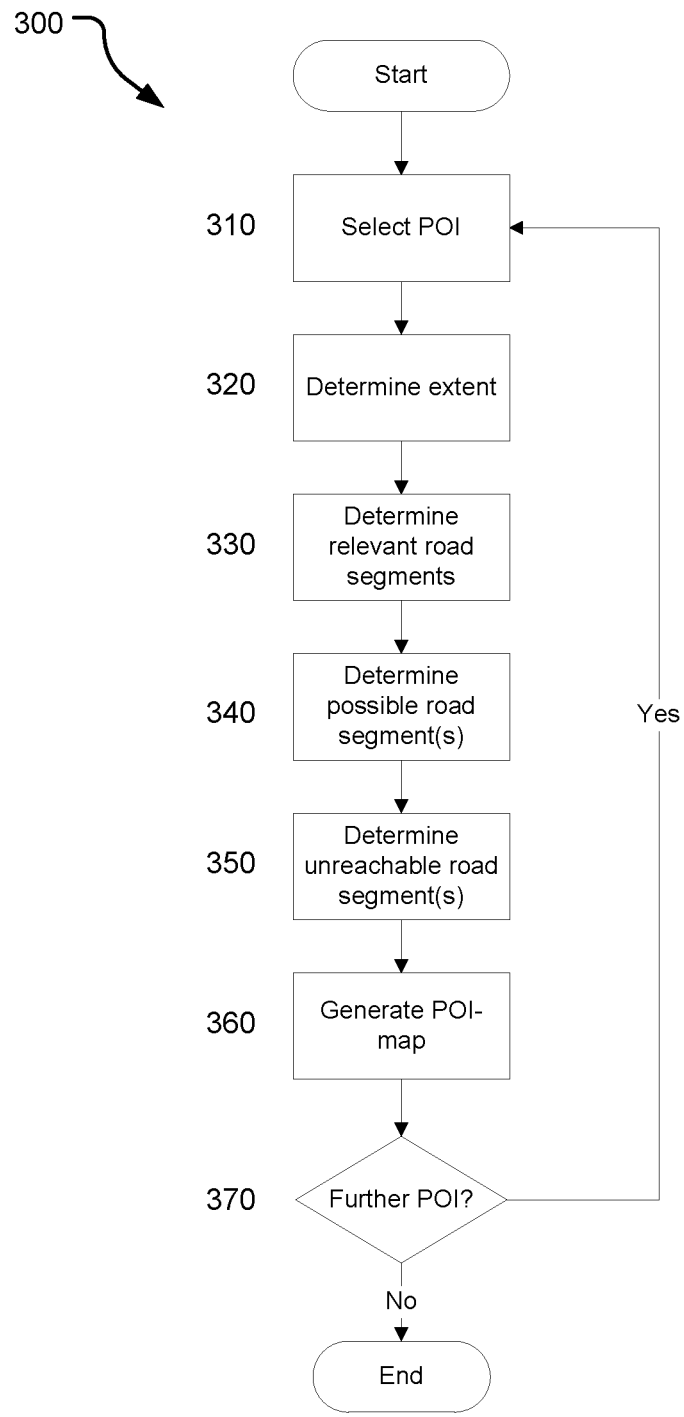
FIG. 4 illustrates a method for generating a POI-maps according to an embodiment of the invention.

Operation of the POIM 240 according to an embodiment of the invention will be explained with reference to a method 300 according to an embodiment of the invention which is illustrated in FIG. 4 and example map data shown in FIGS. 5 and 6. The method 300 may be performed by the POIM 300 operatively executing on the server computer 210.

The method 300 comprises a step 310 in which a POI, such as a SED, is selected. It will be realised that the method 300 may be repeated for each of a plurality of POIs. In the case where the POI is a SED the SED may be selected from the SED database 230. The method 300 generates a POI-map for the selected POI. Whilst the method is described with reference to an SED as an exemplary POI it will be realised that embodiments of the invention are not limited in this respect. The POI may be any location at which a feature of interest exists such as a parking area, an airport, a retail outlet, a site of historic interest, etc.

Step 320 comprises associating the POI with a portion of digital map data. In particular, step 320 comprises determining an extent of map data associated with the POI, such as a location about one or more road segments defined in the map data. Where the SED data defines the locations of SEDs independently of the map data it may be necessary to associate the selected SED with at least one road segment, i.e. to determine which road segment in the map data the SED is associated with, and the position of the SED along the road segment. In some instances the SED may be associated with a portion of a road segment, i.e. along a length of road segment, or with a plurality of road segments such as from a position along a first road segment to a position along a second road segment. It will be appreciated that some SEDs are arranged to monitor a speed of vehicles along a section of road rather than just at a single point on a road.

As noted above, where the POI is an SED the extent of the POI-map is, in one embodiment, based on a warning distance or time. In an exemplary embodiment, the extent of the POI-map is based on a warning time of 15 seconds, although it will be realised that other warning times may be chosen. The extent of the POI-map is at least a distance expected to be travelled within the warning time such that a warning of the SED may be provided whilst navigating road segments defined within the POI-map toward the SED. The extent of the POI-map may be at least the warning distance from the SED. The extent of the POI-map may be equal to the distance expected to be travelled within the warning time or the warning distance. The distance expected to be travelled within the warning time may be calculated based on an expected maximum travelling speed which may be based on a speed limit associated with a road segment on which the POI is located. For example the maximum expected travelling speed may be double a speed limit associated with the road, although other maximum expected travelling speeds may be chosen. The extent of the POI-map may be, for example, less than 5 km, less than 2 km, or less than 1 km from the POI. The POI-map may be associated with only one POI.

Figure 5A:
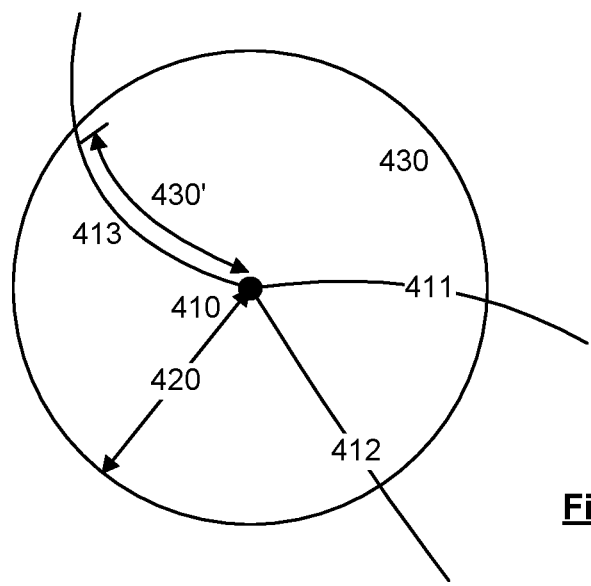
FIG. 5 illustrates an extent of a POI-map according to an embodiment of the invention.

In one embodiment the extent of the POI-map is determined as a circle having a radius corresponding to the extent of the POI map. FIG. 5A illustrates a portion of map data from map database 220 comprising a node 410 connected to three road segments 411, 412, 413. A radius corresponding to the distance expected to be travelled in the warning time or the warning distance is illustrated as 420. Thus, in one embodiment, the extent of the POI-map is a circular portion 430 of the map data based upon the radius 420. It will be realised that the POI map may be unidirectional from the SED i.e. where the SED is arranged to only enforce a speed limit in one direction along a road, it may be deemed unnecessary to provide a warning to a vehicle travelling toward the SED in an opposing direction. Therefore the extent of the POI-map need not be circular and may be, for example, a sector extending from the location of the SED which is directed in the direction in which the SED enforces the speed limit.

In another embodiment the extent of the POI map is determined based upon at least some routes leading to the location of the POI. That is, step 320 may comprise determining a position along a route leading to the POI of the expected travelling distance or warning distance wherein the position corresponds to the extent of the POI-map. Therefore the POI-map generated in this way may not have a uniform shape, such as circular, since the extent of the POI-map from the POI varies according to a directness of road segments i.e. curved road segments cause the extent to be reduced in a corresponding heading from the POI. For example, referring to FIG. 4, an extent of the POI-map along road segment 413 may be determined as distance 430' which is shorter than circular extent 420 due to curvature of road segment 413. The distance along all road segments 411, 412, 413 may be determined and a shape of the POI-map determined by connecting the determined position along each road segment by appropriate curves or straight lines. Advantageously this approach only includes relevant areas in the POI-map. In this embodiment step 320 may comprise determining all routes which lead to the POI 410 and determining the extent of the POI-map along each of the routes.

Figure 5B:
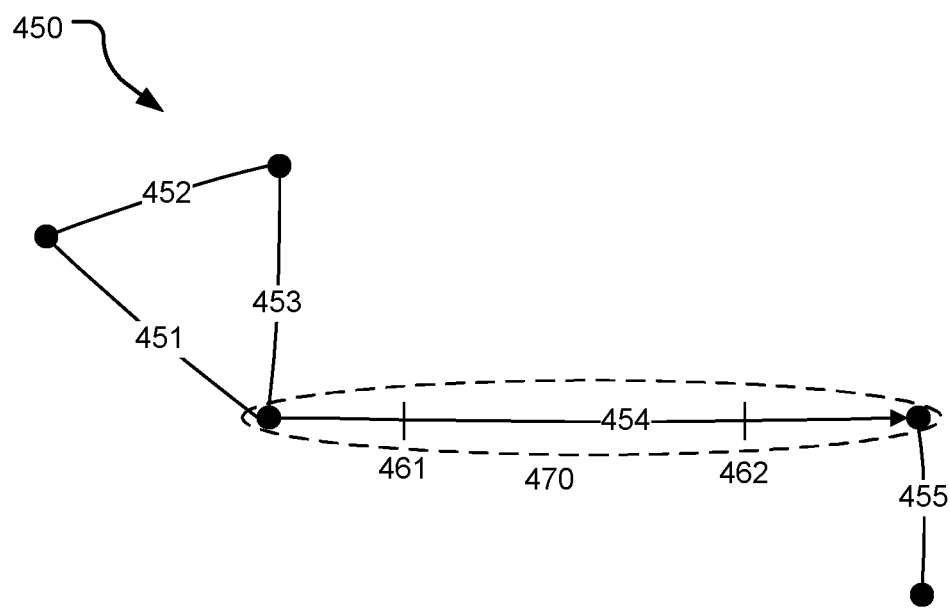

In one embodiment the extent of the POI-map is based on an attribute of the POI with which it is associated, such as a type of SED. FIG. 5B illustrates a portion of map data 450 comprising road segments 451-455. A SED is arranged to monitor a speed of vehicles along road segment 454 between a first location 461 and a second location 462. In this case the extent of the POI-map may be determined to be between the first and second locations 461, 462 or, as indicated in FIG. 5B with dashed lines the extent of the POI-map may encompass road segments which are at least partly monitored by the SED, i.e. in this example road segment 454. Some SEDs are arranged to monitor an average speed of vehicles between the first and second locations 461, 462 and therefore it is only necessary to provide a warning once passing either the first or second location 461, 462 and thus the extent of the POI-map may be reduced, whilst other SEDs may monitor a maximum speed of vehicles between the first and second locations 461, 462 and therefore a warning on entering road segment 454 may be desired. Thus it can be appreciated that the extent of the POI-map depends upon the type of POI, such as the type of SED, in one embodiment.

Step 330 comprises determining relevant road segments to include in the POI-map. In one embodiment all road segments in the map database 220 within the extent of the POI-map are included within the POI-map. However in other embodiments the POI-map only comprises selected road segments. The selected road segments may only be those having a high probability of leading to the POI. A road may have a high probability of leading to the POI if it is a road on which the POI is located or which leads directly to the road on which the POI is located. A road leading directly to the road on which the POI is located may be, for example, one which has less than a predetermined angle between an axis of the road segment proximal to the road segment on which the POI is located, and an axis of the road segment on which the POI is located.

Figure 6:
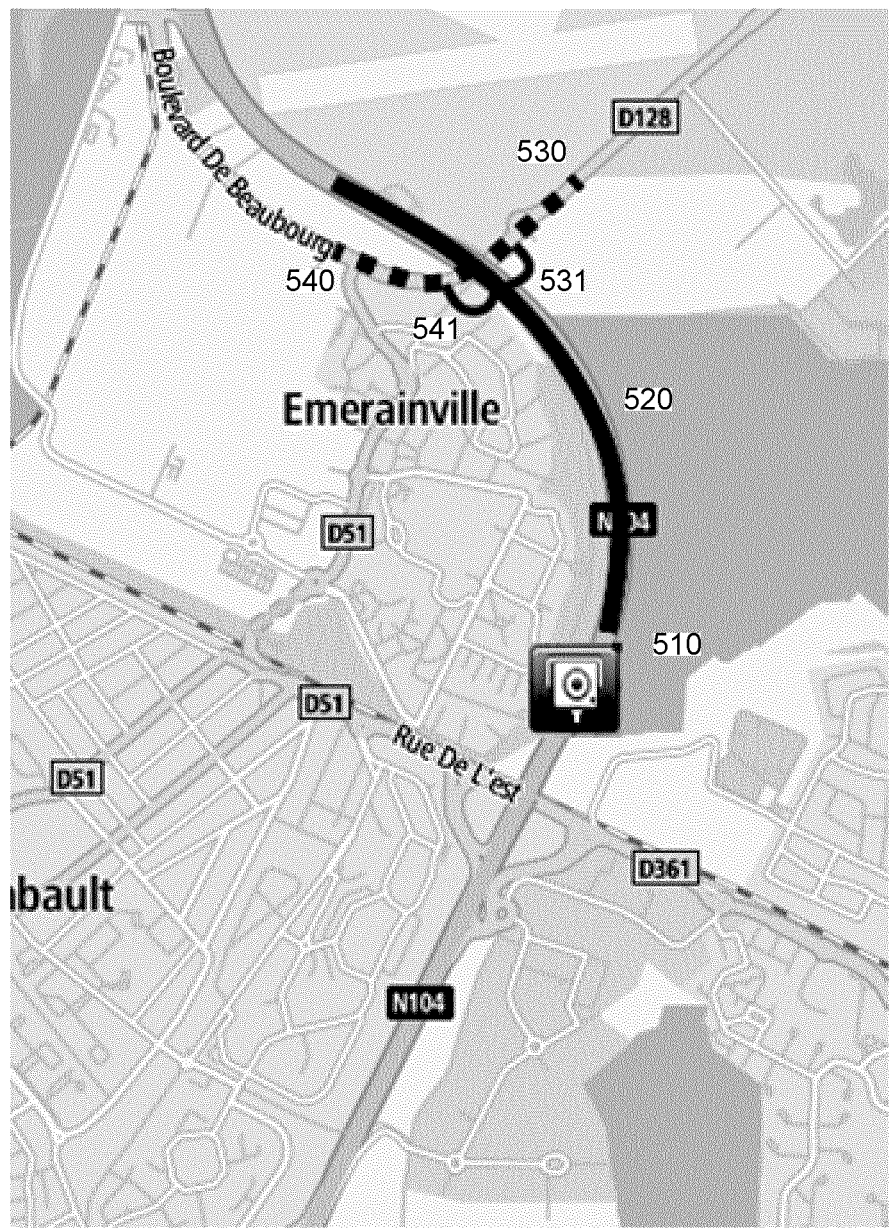
FIG. 6 illustrates map data and a representation of a POI-map according to an embodiment of the invention.

FIG. 6 illustrates an area of map data comprising various roads including a major road and surrounding minor roads. A SED 510 is located adjacent the road as indicated in FIG. 5. In step 330 the major road is determined to be a relevant road since the SED 510 is located on this road. Thus a road segment 520 corresponding to the major road within the extent of the POI-map is included in the POI-map, as illustrated in FIG. 6. In order to include the road segment between the location of the SED 510 and the extent POI-map in the POI-map a new node may be inserted along the road segment in the map data stored in the map database at a location corresponding to the SED 510. It will be realised that in the map data stored in the map database 220 a node may not exist at the location of the SED 510 due to this being at an intermediate position of a road segment. Nodes may also be inserted to terminate road segments at an outer extent of the POI-map. Thus step 330 may comprise trimming a road segment to a location of the POI 510, such as the SED, an inserting a node at the location of the POI.

Step 340 is optional and may be omitted from some embodiments of the method 300. In step 340 one or more road segments which may possibly lead to the SED 510 are determined. That is which have less than a certain probability of leading to a POI. A road segment may be considered to possibly lead to the SED 510 if a probability of a vehicle on the road segment passing the SED 510 is less than a predetermined value. In one embodiment the probability of the vehicle passing the SED 510 is less than the predetermined value if more than a predetermined angle exists between an axis of the road segment proximal to the road segment on which the POI is located, and an axis of the road segment on which the POI is located. For example, road segments 530 and 540 shown in FIG. 5 with dashed lines are connected to road segment 520 on which SED 510 is located. However an angle 531, 541 exists between each road segment and the road segment 510. Therefore these road segments 530, 540 are considered as having a lower probability of leading to the SED 510. Data indicative of the road segments 530, 540 in the POI-map may be associated with an identifier to denote their respective lower probability of leading to the SED 510.

Step 340 may include identifying one or more categories of road segment having, respectively, lower probabilities of leading to the POI. For example, road segments connecting the road segment on which the SED 510 is located via a plurality of turns of more than a predetermined angle may be identified as a further, less likely, category and identified in the POI-map with a further identifier. The roads of the one or more further categories may be used by a navigation device having received the POI-map and travelling along, for example, road segment 530 to generate a warning of the SED 510 which is less severe than if the navigation device is travelling along road segment 520. Whilst an angle between road segments has been described as providing basis for the one or more lower probabilities it will be realised that other attributes or features of road segments may be used to determine the lower probability.

Step 350 is optional and may be omitted in some embodiments of the method 300. In step 350 one or more road segments, within the extent of the POI-map, from which the POI cannot be reached are identified. In particular step 350 may comprise determined one or more road segments which are not associated with the SED.

The POI-map is used by a navigation device to, for example, determine whether to warn a user as they approach the SED 510. One problem with prior art techniques, as explained above, is the issuance of false-warnings. A navigation device uses the POI-map to determine a road segment on which the navigation device, or a vehicle associated there-with, is travelling. A location determined by the navigation device based on wireless signals is compared against the locations of road segments in the POI-map to determine the appropriate road segment, i.e. the current road segment on which the device is located, and a position along the road segment of the device. In some cases a vicinity of the navigation device may be relatively densely populated by road segments. For example, the navigation device may be travelling along a road which runs alongside another road, or a raised section or road may pass close-by overhead to the road on which the navigation device is located. In these cases the navigation device may incorrectly determine its location to correspond to a road segment on which the SED 510 is located and issue a false-warning.

In step 350 the one or more road segments within the extent of the POI-map but from which the SED 510 cannot be, or has less than a predetermined probability of being, reached are identified. These road segments are associated with an appropriate identifier in the POI-map. Thus if the location of the navigation device is determined to correspond to such an identified road segment in the POI-map a false-warning may be prevented. Omission of such road segments from which the SED 510, is unlikely, or cannot be, reached may cause the navigation device to determine its location to correspond to a road segment from which the SED 510 may be reached.

In step 360 the POI-map is generated. The POI-map is generated by the POIM 240 outputting POI-map data indicative of at least road segments identified in step 330. The POIM 240 may also output data indicative of one or both of the road segments identified in steps 340 and 350.

Figure 7:
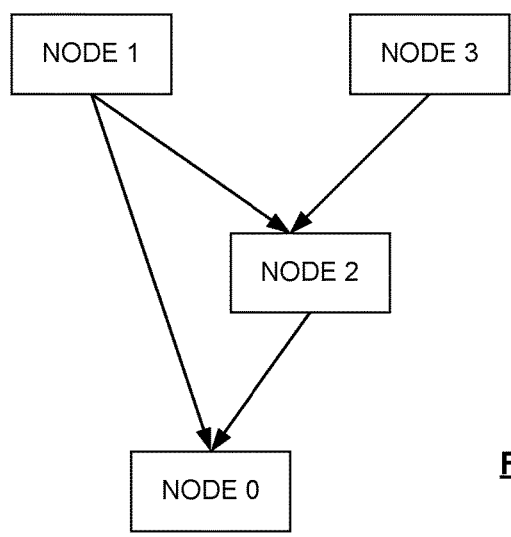
FIG. 7 illustrates an exemplary adjacency list representation of a POI-map.

The POI-map may be generated as a graph, in particular as an adjacency list. In such an adjacency list data indicative of nodes is stored in association with a list of adjacent nodes. Road segments are indicated by the adjacency of nodes. For example, FIG. 7 shows four nodes: node 0; node 1; node 2; and node 3, together with the directional connections therebetween. The arrangement of FIG. 7 can be stored as an adjacency list in the following manner:

| | |
|---|---|
| [0]: {Node 0}: [ 0 ] | node 0 has no outgoing connections |
| [1]: {Node 1}: [ {0}, {2} ] | node 1 has outgoing connections to nodes 0 and 2 |
| [2]: {Node 2}: [ {0} ] | node 2 has outgoing connections to node 0 |
| [3]: {Node 3}: [ {2} ] | node 3 has outgoing connections to node 2 |

The POI-map data may comprise data indicative of one or more attributes for each node, such as a geographic location which the node represents. The geographic location may be identified by longitude and latitude coordinates. The node indicative of the SED may be associated with an attribute indicative of the type of SED. The attribute may indicate, for example, that the SED is a mobile SED, i.e. a portable or moveable SED (as opposed to a fixed SED), the type of SED such as instantaneous speed, maximum speed, average speed, etc. It will be realised that where other types of POI are represented by the node then suitable attributes may be stored indicative of the POI.

The POI map data may contain road segment attributes indicating one or more of a length, speed and type or classification of the road segment, wherein the type of classification identifies whether a road segment is identified in steps 340 or 350, in some embodiments, as discussed above.

In some embodiments the POI-map data defines, at least approximately, an indication of a geometry of each road segment. For example the geometry of each road segment may be defined based on one or more curves or shape points. In this way a navigation device in receipt of the POI-map data may more accurately determine a road segment corresponding to the device's location based on the geographic location of a node and the geometry of the road segment associated with the node.

In step 360 the POI-map data is stored in the POI-map database 250. Step 360 may comprise inserting the POI-map data into the database associated with one or more appropriate identifiers. For example the POI-map data may be associated with a geographic area or cell within a geographic region such as a country. The cell may define a portion of the geographic region. The geographic region may be divided into a plurality of cells which are each associated with one or more POI-maps. Thus in step 360 a plurality of POI-maps may be identified which are all associated with one cell for communication together to a navigation device within the cell, or within a nearby cell.

In step 370 it is determined whether any further POIs remain in the map database 220. The method 300 may be repeated for each of a plurality of POIs, such as for a plurality of SEDs stored in the SED database 230. If so then the method returns to step 310 where a next POI is selected. Otherwise the method ends.

One the method 300 has been repeatedly iterated for a plurality of POIs the POI-map database 250 stores POI-map data for each of the plurality of POIs. The POI-map data is indicative of at least some road segments in the vicinity of each POI. The method 300 may be repeated for new POIs, such as new SEDs, added to the SED database. For example data indicative of a location of a mobile SED may be added to the SED database 230 and the method 300 repeated for that new SED.

POI-map data may be communicated to a navigation device by the server computer 210 or another computer communicably coupled to the POI-map database 250. The server computer 210 may receive location data indicative of the location of the navigation device such as via a wireless communication channel established with the navigation device. In response the server 210 determines whether the location of the navigation device is within a predetermined distance of any POIs in the POI map database 250 and communicates the POI-map data for those POIs to the navigation device. The predetermined distance may be, for example, 5 km or 10 km. In this way the navigation device is able to accurately determine whether its location corresponds to a road segment associated with the POI based on the POI-map data without it being necessary to store map data for an entire geographic region, such as a country. The navigation device may delete store POI-map data after a predetermined time or when the location of the navigation device moves more than a predetermined distance from the POI.

Whilst embodiments of the invention have been described above with reference to navigation devices is will be realised that embodiments of the invention are not so limited. The POI-maps stored in the database 250 may be useful to any mobile device. The mobile device comprises a processor, a memory for storing data, a module for determining a location of the mobile device 150 and a communication module for data communication so as to be able to communicate with server providing POI-map data to the mobile device. The mobile device may be a computing device such as a smartphone, tablet or laptop computer which operatively executes appropriate software. For example, the mobile device may provide a warning as a location of the device approaches the location of the SED. Since SEDs are typically located at locations having a high accident rate, such warnings improve safety by providing warning of the high accident rate location. In some instances such a device may or may not be capable of also providing a navigation functionality. A navigation functionality may include an ability for a user to enter at least a destination location into the device and to receive route guidance to the location. The mobile device may be a device such as the navigation device described above. A navigation device is a device for use within a vehicle, which may provide navigation information relating to a current vicinity of the device such as a notification associated with a point of interest proximal to the location of the device. Commonly mobile devices include navigation satellite signal reception and processing functionality, although it will be realised that navigation devices are not limited to using navigation satellite signals and may use other wireless signals such as Wi-Fi and cellular communication signals for location-determination.

It will be realised that embodiments of the present invention provide methods and apparatus for providing map data in the vicinity of points of interest. The map data may be provided to a mobile device thereby reducing the need for the mobile data to store data for an entire geographic region. The data may be used by the mobile device to provide navigation in the vicinity of the point of interest, or to provide a notification associated with the point of interest. In particular embodiments of the invention may be used to provide a warning of a location of a speed enforcement device. By using map data to provide the warning the possibility of false-warnings is reduced without incurring a storage penalty of storing data for a geographic region such as a country.

As discussed above, embodiments of the invention further relate to the provision of information associated with a POI, such as a notification or warning, using an mobile device, e.g. a navigation device, based on received map information associated with the POI.

A navigation device storing map information associated with a POI is able to determine a navigable segment or road on which the navigation is located or travelling. In this way the navigation device is able to accurately determine whether to output information, such as a notification or warning, associated with the POI. The navigation device may also navigate in the vicinity of the POI based on the map information. However it is not necessary for the navigation device to store map and POI information for an entire geographic region, such as a country.

A navigation device according to an embodiment of the invention is a device capable of determining its geographic location from received wireless signals, wirelessly communicating with a server computer to receive map information associated with a POI and outputting information associated with the POI based on the geographic location of the navigation device. The navigation device may be implemented by a portable computing device executing appropriate software. The software may provide a navigation functionality such as allowing the user to input at least a desired destination and the software providing route guidance to the destination. Additionally or alternatively the software may provide notification or warning functionality of POI such as a warning when the navigation device is approaching a geographic location of a SED. In this sense the navigation device may be a SED warning device. For the sake of clarity, therefore, it will be appreciated that the navigation device does not necessary need to be able to provide route planning functionality or guidance functionality, e.g. relative to planned route.

Figure 8:
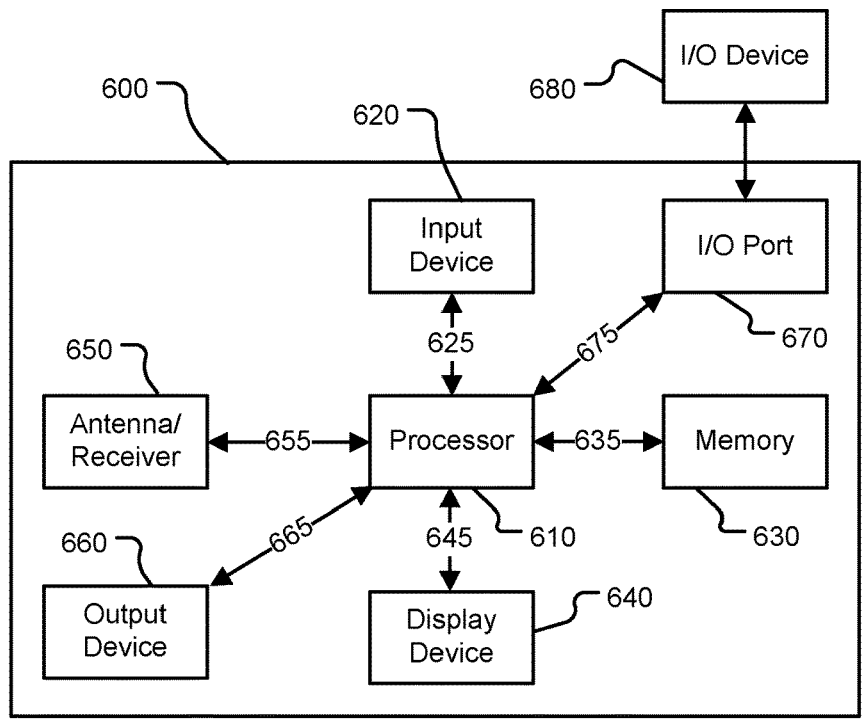
FIG. 8 illustrates a schematic layout of a navigation device according to an embodiment of the invention.

FIG. 8 is an illustrative representation of electronic components of a navigation device 600 according to a preferred embodiment of the present invention, in block component format. It should be noted that the block diagram of the navigation device 600 is not inclusive of all components of the navigation device, but is only representative of many example components.

The navigation device 600 is located within a housing (not shown). The housing includes a processor 610 connected to an input device 620 and a display screen 640. The input device 620 can include a keyboard device, voice input device, touch panel and/or any other known input device utilised to input information; and the display screen 640 can include any type of display screen such as an LCD display, for example. In a particularly preferred arrangement the input device 620 and display screen 640 are integrated into an integrated input and display device, including a touchpad or touchscreen input so that a user need only touch a portion of the display screen 640 to select one of a plurality of display choices or to activate one of a plurality of virtual buttons.

The navigation device may include an output device 660, for example an audible output device (e.g. a loudspeaker). As output device 660 can produce audible information for a user of the navigation device 600, it is should equally be understood that input device 640 can include a microphone and software for receiving input voice commands as well.

In the navigation device 600, the processor 610 is operatively connected to and set to receive input information from input device 620 via a connection 625, and operatively connected to at least one of display screen 640 and output device 660, via output connections 645, to output information thereto. Further, the processor 610 is operably coupled to a memory resource 630 via connection 635 and is further adapted to receive/send information from/to input/output (I/O) ports 670 via connection 675, wherein the I/O port 670 is connectible to an I/O device 680 external to the navigation device 600. The memory resource 630 comprises, for example, a volatile memory, such as a Random Access Memory (RAM) and a non-volatile memory, for example a digital memory, such as a flash memory. The external I/O device 680 may include, but is not limited to an external listening device such as an earpiece for example. The connection to I/O device 680 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 600 and the internet or any other network for example, and/or to establish a connection to a server via the internet or some other network for example.

FIG. 8 further illustrates an operative connection between the processor 610 and an antenna/receiver 650 via connection 655, wherein the antenna/receiver 650 can be a global navigation satellite system (GNSS), such as GPS, antenna/receiver for example. It will be understood that the antenna and receiver designated by reference numeral 650 are combined schematically for illustration, but that the antenna and receiver may be separately located components, and that the antenna may be a GNSS patch antenna or helical antenna for example.

Further, it will be understood by one of ordinary skill in the art that the electronic components shown in FIG. 8 are powered by power sources (not shown) in a conventional manner. As will be understood by one of ordinary skill in the art, different configurations of the components shown in FIG. 8 are considered to be within the scope of the present application. For example, the components shown in FIG. 8 may be in communication with one another via wired and/or wireless connections and the like. Thus, the scope of the navigation device 600 of the present application includes a portable or handheld navigation device 600.

In addition, the portable or handheld navigation device 600 of FIG. 8 can be connected or "docked" in a known manner to a vehicle, such as a motorbike or a car for example. Such a navigation device 600 is then removable from the docked location for portable or handheld navigation use.

The navigation device 600 may establish a "mobile" or telecommunications network connection with a server, such as a server in communication with POI-map database 250, via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with the server. As such, a "mobile" network connection is established between the navigation device 800 (which can be, and often times is mobile as it travels alone and/or in a vehicle) and the server to provide a "real-time" or at least very "up to date" gateway for information.

The navigation device 600 may include its own mobile phone technology within the navigation device 600 itself (including an antenna for example, or optionally using the internal antenna of the navigation device 600). The mobile phone technology within the navigation device 600 can include internal components as specified above, and/or can include an insertable card (e.g. Subscriber Identity Module or SIM card), complete with necessary mobile phone technology and/or an antenna for example. As such, mobile phone technology within the navigation device 600 can similarly establish a network connection between the navigation device 600 and a server, via the internet for example, in a manner similar to that of any mobile device.

Figure 9:
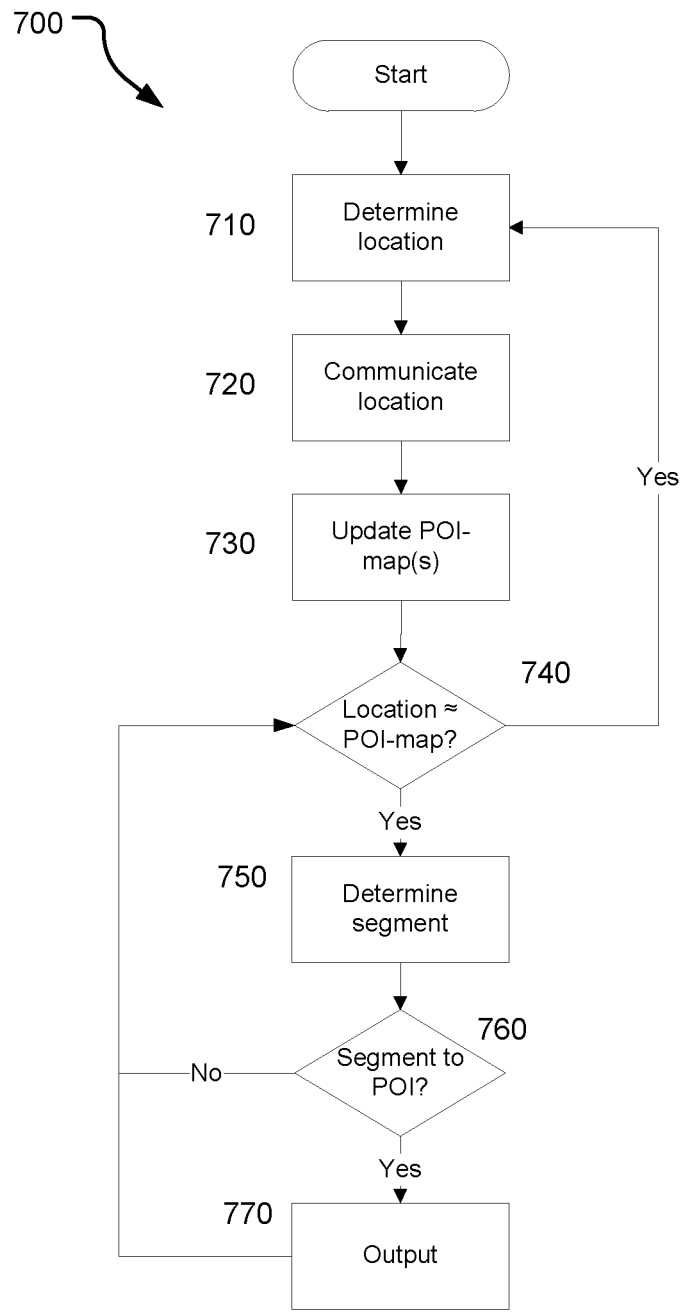
FIG. 9 shows a method for providing information associated with a POI according to an embodiment of the invention.

FIG. 9 illustrates a method for providing information associated with a POI on a navigation device 600, which is capable of receiving POI-map data, e.g. wirelessly from POI-map database 250, according to an embodiment of the invention.

The method 700 comprises a step 710 of determining a location of a navigation device 600. Step 710 may be performed by the navigation device 600 determining its location from received wireless signals such as received satellite navigation signals (e.g. GPS, Galileo, etc), Wi-Fi, telecommunication signals, etc. For example, the processor 610 may determine the location of the navigation device 600 based on GPS signals wirelessly received by antenna 650. The location may be denoted as a longitude and latitude, although it will be realised that other location referencing systems may be used.

In step 720 information indicative of the location is communicated to a server computer. The information may be communicated from the navigation device 600 to the server computer with which the navigation device 600 is, at least periodically, communicably coupled.

It will be realised that, in some embodiments, steps 710 and 720 may be replaced with a step in which the location of the navigation device 600 is determined by the server computer. For example the location of the navigation device 600 may be determined based on a telecommunication network with which the navigation device 600 is communicably coupled.

Step 730 comprises the navigation device receiving one or more POI-maps, e.g. of a form as described above. The one or more POI-maps are communicated from the server to the navigation device 600 via a wireless communication channel. The server is arranged to select the one or more POI-maps for communication to the navigation device 600. The selection may be based on the information indicative of the location communicated from the navigation device 600 to the server computer in step 720. The server computer is associated with a store of POI-maps, such as a database of POI-maps, e.g. database 250 shown in FIG. 2. The store of POI-maps may be for a geographic region, such as one or more countries or states, although it will be realised that these are not limiting. Each POI-map is associated with a respective point of interest (POI). In one exemplary embodiment at least some POI-maps are associated with SEDs.

Figure 10:
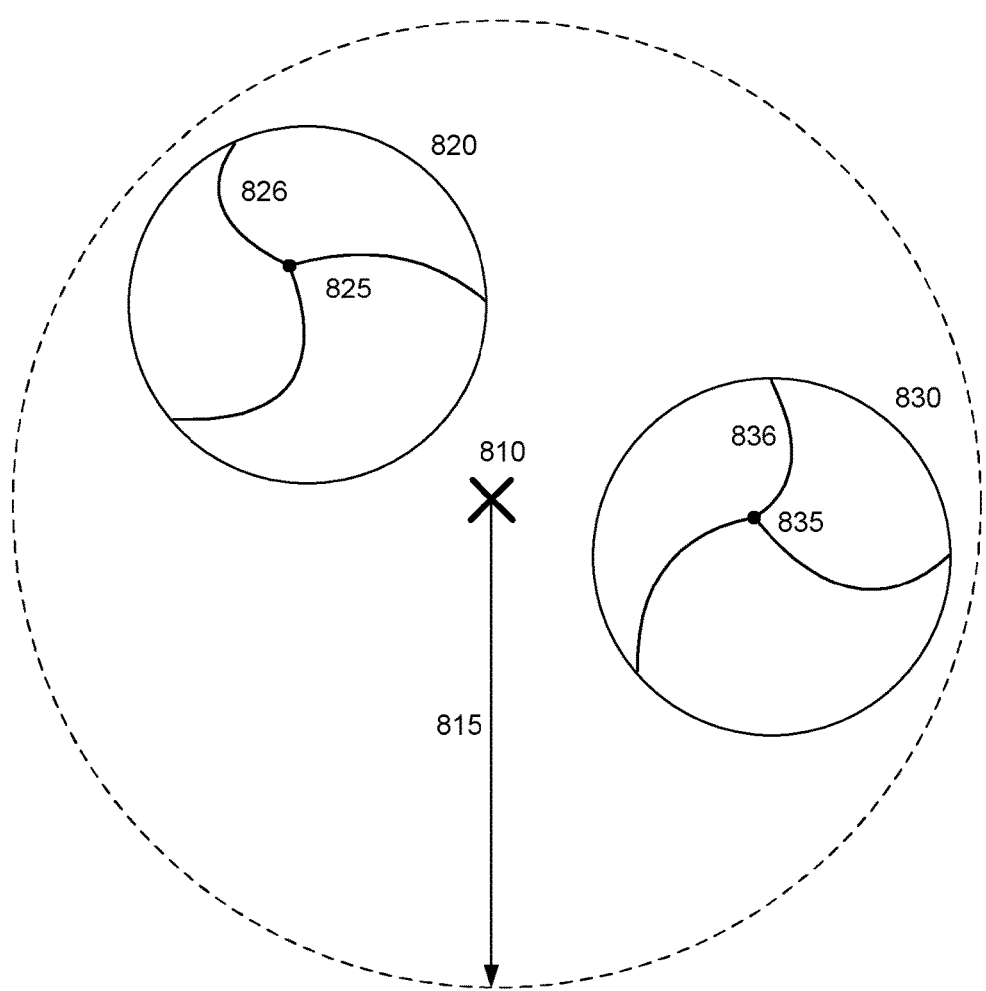
FIG. 10 shows an illustration of POI-maps according to an embodiment of the invention.

Referring to FIG. 10, the server is arranged to select POI-maps for POIs within a predetermined radius 815 of the location 810 of the navigation device 600. It will be realised that other methods for selecting the POIs may be used. For example, POIs within a tile corresponding to the location 810, i.e. within which the location resides, may be selected.

In the example illustrated in FIG. 10 first 825 and second 835 POIs are selected as being within the radius 815 of the navigation device's location. POI-maps 820, 830 associated with the first and second POIs 825, 835 are communicated in step 730 from the server to the navigation device 600. The POI-maps are then stored in the memory 630 of the navigation device 600.

The first POI-map 820 comprises data indicative of the first POI 825 and roads 826 (only one of which is provided with a reference numeral for clarity) proximal to the first POI 825. The second POI-map 830 comprises data indicative of the second POI 835 and roads 836 (only one of which is provided with a reference numeral for clarity) proximal to the second POI 825.

Referring again to FIG. 9, in step 740 it is determined whether the current location of the navigation device approximately corresponds to an area of a POI-map. The POI-map is stored, potentially as one of a plurality of POI-maps, in the memory 630 of the navigation device 600.

Figure 11:
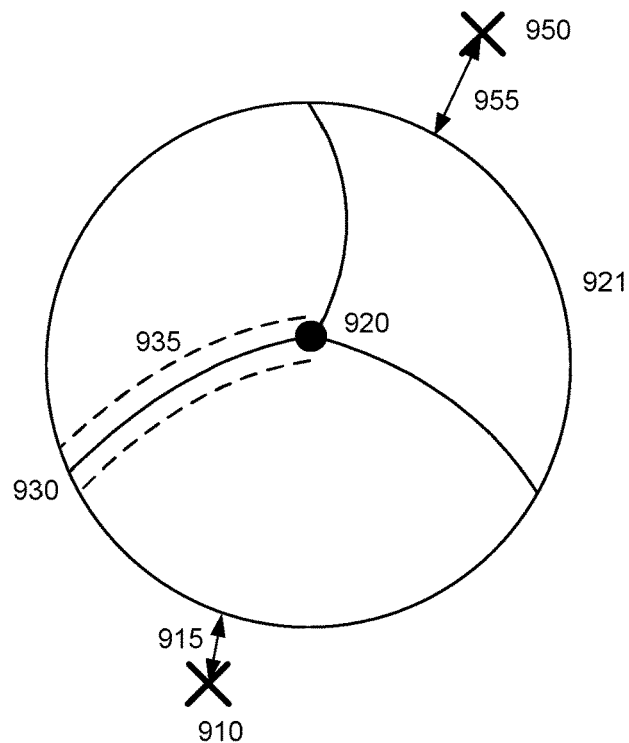
FIG. 11 illustrates operation of an embodiment of the invention with respect to a POI-map.

FIG. 11 illustrates step 740 in more detail. At a first point in time a location 910 of the navigation device 600 is external to the area of a POI-map 921 a periphery of which is indicated in FIG. 11. The POI-map 921 is associated with a POI 920. Step 710 comprises determining whether the location 910 of the navigation device is within a first distance 915 of the area of the POI-map 921. If the location 910 is within the first distance of the POI-map then the POI is selected to provide map data indicative of navigable segments within a vicinity of the navigation device 600, as will be explained particularly with reference to step 750.

At a second point in time, later than the first, following use of the POI-map a position of the navigation device is indicated with reference 950. For example the navigation device has travelled through the area of the POI-map 921 from initial location 910. During this period the POI-map data has been used by the navigation device to determine a road segment on which the navigation device is travelling. The POI-map data is used until a location 950 of the navigation device is more than a second distance 955 from the area 921 of the POI-map. That is, the POI-map data is used by the navigation device from a point at which the navigation device is within the first distance of the area covered by the POI map 921 until the navigation device is a second distance 955 from the area covered by the POI-map data 921. The second distance 955 is greater than the first distance 910. For example the first distance 915 may be 10 m and the second distance 955 may be 25 m, although it will be realised that other distances may be used. Thus the navigation device selects the POI-map based on a hysteresis distance. Advantageously this assists in preventing false notifications of proximity to a POI, such as an SED, occurring, i.e. when the navigation device is travelling close to a periphery, such as just outside, the area of the POI-map 921. In this case, if only a single distance was utilised, the navigation device may de-select the POI-map and then quickly reselect the POI-map which may cause a notification of the POI to be generated intermittently.

It will be realised in some embodiments the POI-map data may not define an extent of the geographic area represented. For example, the POI-map data may define a location of the POI 920 and locations of roads in the vicinity of the POI without explicitly defining the extent of the geographic area 921. In this case the first and second distances 910, 955 may be considered with respect to the location of the POI 920, i.e. as distances from the POI 920.

If the location of the navigation device 600 does not currently correspond to a POI-map then the method returns to step 710. Otherwise, if the location 910 is within the first distance of the POI map in one embodiment, the POI map is selected and the method moves to step 750.

In step 750 it is determined whether a location of the navigation device corresponds to a segment in the POI-map data. That is, it is determined whether the navigation device is present upon a road segment defined in the POI-map data. Step 750 comprises determining whether a location of the navigation device is within a bounding region 935 defined around each road segment 930 in the map data. It will be appreciated that only one bounding region is illustrated in FIG. 11 for clarity. If the location 910, 955 of the navigation device 600 is not within a bounding region around any road segments in the map data then it is assumed that the navigation device is, for example, within a vehicle which is "off-road" such as in a parking area. However if the location 910, 955 is determined to be within a bounding region 935 then the location of the navigation device is determined to correspond to a position on the associated road segment 930. The position on the road segment may be determined to be a portion of the road segment 930 closest to the current location of the navigation device.

In step 760 it is determined whether the current segment is one leading to the POI with which the POI-map is associated. The POI-map may comprise data indicative of segments which either have a lower probability of being traversed en route to the POI, or from which the POI cannot be reached. As an example, the POI may represent an SED of which it is desired to provide a warning to the user if the user is about to pass a location of the SED. In some cases, a vicinity of the SED may be relatively densely populated by road segments. For example, the navigation device may be travelling along a road which runs alongside another road, or a raised section of road may pass close-by overhead to the road on which the navigation device is located. In these cases the navigation device may incorrectly determine its location to correspond to a road segment on which the SED 910 is located and issue a false-warning.

In step 760 it is determined, in some embodiments, based an attribute associated with the road segment selected in step 750, whether the navigation device is present upon a road segment from which the SED 910 cannot be, or has less than a predetermined probability of being, reached. These road segments are associated with an appropriate identifier in the POI-map data. Thus if the location of the navigation is determined to correspond to such an identified road segment in the POI-map a false-warning may be prevented. For example, a road close to a road segment but which is not actually a road segment upon which an SED is located, may be identified as such in the POI-map data. In this case the navigation device determines, based on the POI-map data, that the notification or warning of the POI is not to be issued and the method returns to step 740.

As discussed above, FIG. 6 illustrates example POI-map data which is indicative of a SED 510 present upon a road segment 520. Further road segments 530, 540 are defined in the POI-map data and are each associated with an attribute indicative of a lower likelihood of leading to the SED 510 due to an angle 531, 541 of more than a predetermined size to the road segment 520 on which the SED 510 is located. If the navigation device 600 determines its location to correspond to one of segment 530 or 540 then the associated attribute indicates a lower likelihood of passing the SED 510. Therefore the navigation device may, in step 770, output a different notification.

In step 770 a notification associated with the POI is output. In the case that the POI is an SED, the notification may be a warning of the proximal SED. Step 770 may comprise determining whether the navigation device 600 is within a warning distance or warning travelling time of the SED. In some embodiments, the POI-map data may have an extent of the warning distance or warning time and thus if the navigation device is located within the POI-map then the warning should be output. In other embodiments the POI-map has an extent of more than the warning distance or warning time. In some embodiments of the invention the warning time is 15 seconds at an expected travelling speed of along a road segment to the POI and thus step 770 may comprise determining whether the navigation device is within a warning distance which is based on the warning time and expected travelling speed. It will be realised that other warning times may be used.

If the segment on which the navigation device is determined in step 760 to be located is one having an associated lower likelihood of leading to the POI, the notification may be a "soft" notification, such as a warning having lower impact than if the navigation device is located on a segment leading to the SED. Thus the notification type may depend on an attribute associated with the segment determined in step 760.

As explained above, in step 730 the navigation device 600 receives POI-map data based on a location of the navigation device 700. The POI-map data is stored in the memory 630 of the navigation device 600. As the location of the navigation device changes they POI-map data stored in the memory 630 is dynamically updated.

Figure 12:
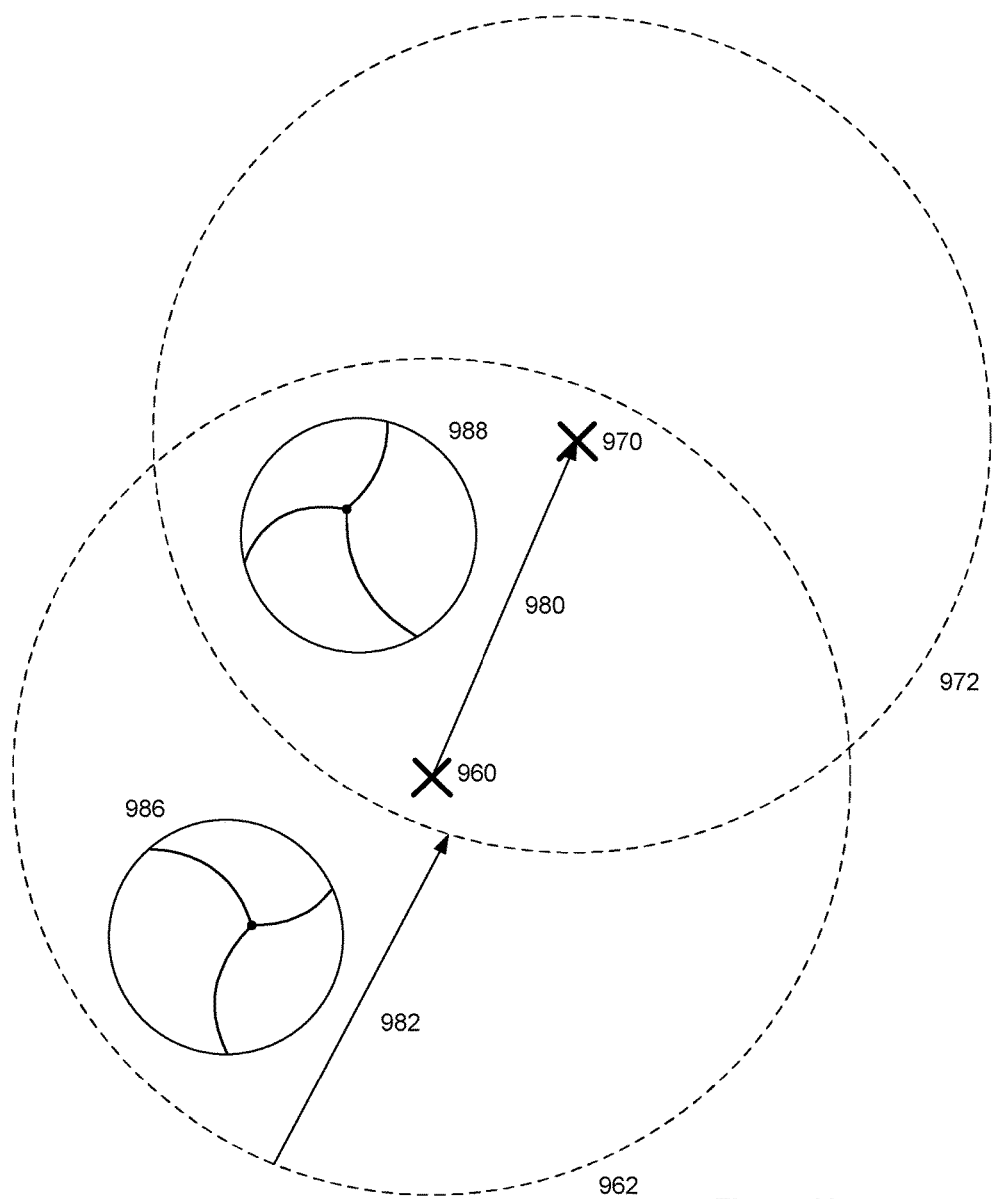
FIG. 12 further illustrates operation of an embodiment of the invention with respect to a POI-map.

FIG. 12 illustrates a location 960 of a navigation device 600 at a first point in time. In step 730 of the method 700 illustrated in FIG. 9 POI-map data for first and second POI-maps 986, 988 within a first region 962 is communicated to the navigation device 600 and stored in the memory 630 of the navigation device 600. At a second point in time, after the first, the navigation device 600 has moved 980 to second location 970. In step 730, which may be repeated at the second location (or any location in-between), POI-map data for a second region 972 is updated. Step 730 may comprise receiving POI-map data associated with POIs in the second region 972. Step 730 may further comprise purging the memory 630 of the navigation device 600 of POI-map data for POIs not in the second region 972. For example, POI-map data for the POI 986 which was present in the first region 962 but not in the second region 972 may be deleted from the memory 630. Alternatively, the POI-map data for the POI 986 may be marked as not being required and only deleted when the memory 630 is full or reaches a predetermined capacity. Advantageously the map data stored in the memory is maintained at a manageable level, which may be less than a storage capacity to store map and POI data for an entire geographic region such as a country.

It will therefore be appreciated that embodiments of the present invention provide a method and apparatus in which a navigation device is provided with map data associated with POIs such that the navigation device may determine a navigable segment on which the navigation device is located proximal to the POI. Advantageously, errors associated with non-map-data based techniques of POI notification may be reduced without it being necessary to store map data for an entire region.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

It should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of providing data associated with a point of interest (POI), comprising:
   determining, based on a location of the POI, a portion of digital map data of a geographic region, said digital map data comprising a plurality of segments representing navigable elements of a navigable network within the geographic region;
   generating POI-map data associated with the POI, the generating comprising adding, to the POI-map data, a listing of segments included within the portion of the digital map data, the listing identifying adjacencies of each of the segments to others of the segments;
   receiving a location associated with a remote device; and
   when the location associated with the remote device is within a specified distance of an area associated with the POI-map data, transmitting, to the remote device, the POI-map data for use by the remote device in providing notifications associated with the POI.

2. The method of claim 1, wherein determining the portion of digital map data comprises determining an extent of the POI-map based on a radius from the location of the POI.

3. The method of claim 1, wherein determining the portion of digital map data comprises determining an extent of the POI-map based on one or more routes leading to the POI.

4. The method of claim 3, comprising determining a plurality of routes leading to the POI and an extent of each route.

5. The method of claim 1, wherein the POI is a speed enforcement device (SED) and the portion of the digital map data is determined on the basis of a warning time or warning distance to the SED.

6. The method of claim 1, comprising selecting the POI from a database storing a plurality of POIs.

7. The method of claim 1, wherein generating the POI-map data comprises inserting a node into the digital map data at the location of the POI.

8. The method of claim 7, comprising storing one or more attributes indicative of features of the POI associated with the node.

9. The method of claim 8, wherein the POI is an SED and the one or more attributes indicate one or both of a type of SED and a direction of the SED.

10. The method of claim 1, wherein generating the POI-map data comprises storing an attribute associated with data indicative of at least one road segment wherein the attribute is indicative of the road segment having a lower probability of leading to the POI.

11. The method of claim 10, wherein the probability of leading to the POI is determined based on an angle between the road segment and a road segment associated with the POI.

12. The method of claim 1, wherein generating the POI-map data comprises determining one or more road segments from which the POI cannot be reached.

13. The method of claim 1, wherein generating the POI-map data comprises storing an attribute associated with data indicative of the one or more road segments from which the POI cannot be reached.

14. The method of claim 1, comprising storing the POI-map data in a database.

15. The method of claim 14, wherein the POI-map data is associated with a cell indicative of a geographic area.

16. A computing device arranged to provide data associated with a point of interest (POI), comprising:
one or more processors configured to:
determine, based on a location of the POI, a portion of digital map data of a geographic region, said digital map data comprising a plurality of segments representing navigable elements of a navigable network within the geographic region; and
generate POI-map data associated with the POI, the generating comprising adding, to the POI-map data, a listing of segments included within the portion of the digital map data, the listing identifying adjacencies of each of the segments to others of the segments;
receive a location associated with a remote device; and
when the location associated with the remote device is within a specified distance of an area associated with the POI-map data, transmit, to the remote device, the POI-map data for use by the remote device in providing notifications associated with the POI.

17. The computing device of claim 16, comprising a non-transitory computer-readable storage medium that stores the generated POI-map data in a data store.

18. A non-transitory computer-readable storage medium storing instructions that, when executed by one or more processors in a computing device, cause the computing device to perform a method for providing data associated with a point of interest (POI), the method comprising:
determining, based on a location of the POI, a portion of digital map data of a geographic region, said digital map data comprising a plurality of segments representing navigable elements of a navigable network within the geographic region;
generating POI-map data associated with the POI, the generating comprising adding, to the POI-map data, a listing of segments included within the portion of the digital map data, the listing identifying adjacencies of each of the segments to others of the segments;
receiving a location associated with a remote device; and
when the location associated with the remote device is within a specified distance of an area associated with the POI-map data, transmitting, to the remote device, the POI-map data for use by the remote device in providing notifications associated with the POI.

* * * * *